Sept. 26, 1939.  J. C. HEINTZ  2,174,189
RETREADING VULCANIZER
Filed Jan. 12, 1938
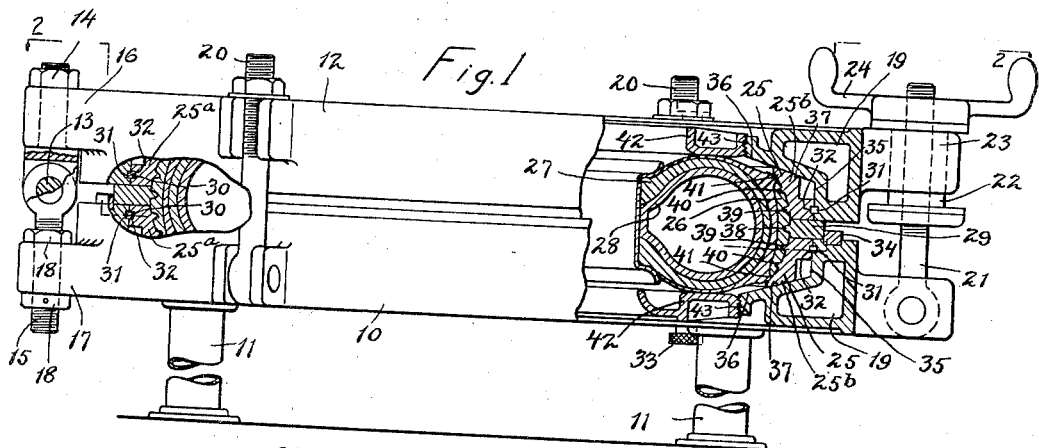
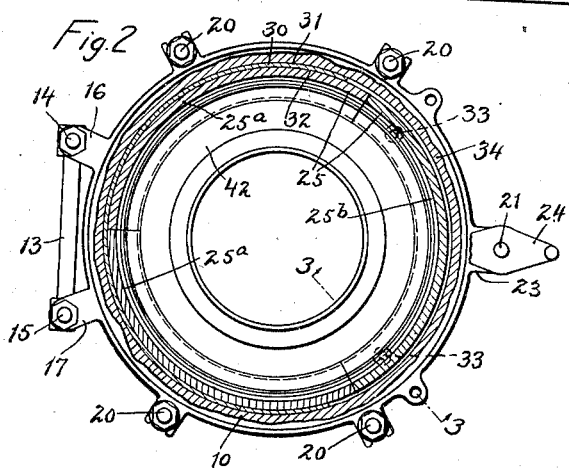
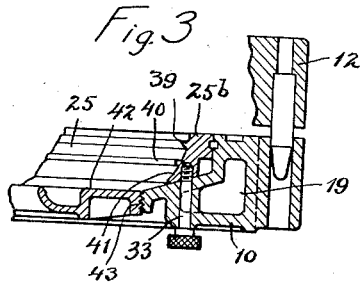
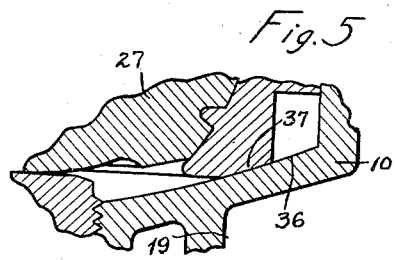
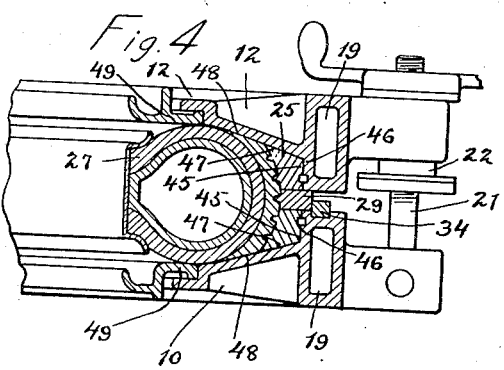
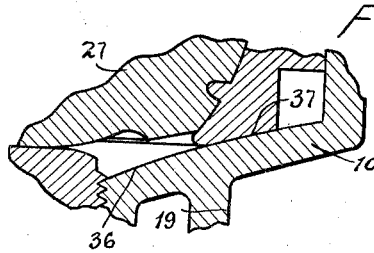
Inventor,
J. C. Heintz,
By Robert M Pierson,
Attorney Patented Sept. 26, 1939

2,174,189

UNITED STATES PATENT OFFICE 2,174,189

RETREADING VULCANIZER

James C. Heintz, Lakewood, Ohio

Application January 12, 1938, Serial No. 184,644

4 Claims. (Cl. 18—18)

This invention relates to vulcanizers, and particularly those of the hinged type for retreading pneumatic tires, although not wholly limited thereto.

My principal objects are to facilitate the mounting and removal of matrix or mold members; to accommodate a wide range of tire dimensions in the same heater, through the provision of an improved mode of mounting alternative matrices of corresponding sizes; to provide an improved mold or matrix whereby tires may be retreaded or recapped with a minimum amount of new rubber in relation to the maximum depth thereof and to the effective tread width, with avoidance of overheating of the old rubber, and to provide a relatively inexpensive vulcanizer capable of performing a high quality of retreading work.

This case is a continuation in part of my prior applications Serial Nos. 85,673 and 85,674, filed June 17, 1936, and Serial No. 200,380, filed April 6, 1938, as a continuation in part of my application Serial No. 163,509, filed September 13, 1937.

Of the accompanying drawing, Fig. 1 is a side elevation, partly broken away and in section, showing a hinged retread vulcanizer constructed in accordance with my invention, in its operative relation to the work.

Fig. 2 is a plan view on a smaller scale, partly broken away and in section approximately on the line 2—2 of Fig. 1, omitting the tire.

Fig. 3 is a detail section on the line 3—3 of Fig. 2.

Fig. 4 is a partial vertical section showing a modification.

Figs. 5 and 6 are detail vertical sections showing two further modifications.

Referring at first to Figs. 1 to 3, 10 is an annular lower heater platen horizontally supported on legs 11, and 12 is a complemental annular upper heater platen hingedly connected with the lower platen at the rear side of the vulcanizer. The hinge includes a pin 13 connecting pairs of upper and lower hinge bolts 14, 15 mounted in respective pairs of lugs 16, 17, the lower bolts having screw stems and adjusting nuts 18 for variably spacing the upper platen from the lower one, in the closed position, according to the width of the tire which is being treated.

The platens are annularly chambered with steam heating jackets 19 and are adapted to be drawn together upon the work by means of clamping bolts 20, 21, whose stems are pivoted upon the lower platen to swing into and out of clamping position. The screw stem of the bolt 21, pivoted at the front of the vulcanizer, opposite to the hinge, is provided with a double-acting nut 22 having upper and lower flanges respectively engaging the top or the bottom face of a forked lug 23 on the upper platen, to exert either a mold-closing or a mold-opening or cracking action upon the upper platen, together with a hand wheel 24 on said nut, adapted to receive a turning bar for extra leverage.

Complemental annular mold members or matrix rings 25 are detachably secured to the lower and upper platens 10 and 12 respectively for molding, to the desired configuration, the rubber tread band 26 upon a rim-mounted tire casing 27 which is placed in the vulcanizer, together with its contained inflating bag 28, and to transmit the vulcanizing heat to said tread band. These matrix rings are customarily made of aluminum and the platens of cast iron. An aluminum spacer ring 29, constituting an intermediate matrix member, may be used between the main matrix rings 25 when required for a wide tread, and such spacer ring may be made in segments and not fastened to the main rings, so that it is easily stripped from a vulcanized tread.

Each of the matrix rings 25 is made in a suitable number of segments, such as three of equal length, and provided with a quick-detachable mounting in its platen 10 or 12. The two segments 25ª adjacent the hinged side of the vulcanizer have a tongue-and-groove engagement with the platen, effected by an outward, substantially radial, sliding edgewise movement of the segment and constituted by an inwardly-projecting arcuate tongue, key member or gib 30 of rectangular section, fixed in a groove 31 on the platen and fitting in a registering groove 32 on the cylindrical back or outer face of the segment.

The third matrix segment 25ᵇ, located opposite to the hinged side of the vulcanizer and acting as a "keystone" or key segment for the other two, is adapted to be inserted and removed by an axial movement and retained in place by a pair of vertical screws 33 near its two ends, having knurled heads for manual operation. When either half of the vulcanizer is to have its matrix changed for one of a different size or pattern, it is a simple matter to retract the screws 33 and the key segment 25ᵇ, by opposite axial movements, then remove the two segments 25ª by sliding each one inwardly to disengage it from the key 30, and effect the replacement with substitute parts. The spacer ring 29, when used, is retained by a removable annular key or locking ring 34.

For mounting each of the matrix or mold members 25 in heat-transmitting contact upon its platen 10 or 12, said platen is shown with two seating portions or surfaces constituting a matrix holder, namely a cylindrical one 35 containing the key groove 31, coacting with the complemental cylindrical outer face of the matrix, and a female conical or generally concave seating surface 36 including several matrix seating zones, located laterally outward and radially inward of the cylindrical seat 35, coacting with a narrower complemental male cone or generally convex seating surface 37 on the platen, as broadly disclosed in my aforesaid applications Serial Nos. 85,673 and 85,674, except that here the insert or matrix ring seating is directly on the platen instead of upon an intermediate matrix ring. While the radial angle of these conical surfaces to a horizontal or normal plane could vary, it is preferably of the order of 15 to 20 degrees, for the relatively wide matrix disclosed in this embodiment, to afford the best combination of width of contact zone between the pairs of conical surfaces and range of mold diameters which can be accommodated between the two platens, the purpose being to accommodate a range of tire casings, varying widely as to outer and cross-sectional diameters, in the same vulcanizer, by providing a corresponding range of matrix sizes.

While truly conical surfaces 36 and 37, or those generated by revolving an inclined straight line about the central axis, are more easily machined to interfit with each other, it will be evident that these surfaces might be slightly curved or arcuate surfaces of revolution, respectively convex and concave in section on a long radius, and of the same average angle as the true cones, as shown in Fig. 5, or the reverse of that as shown in Fig. 6, namely concave and convex, all forms being comprehended within the term "substantially conical".

The form of each insert mold member or matrix 25 and the configuration of its tread-shaping face are suited to the type of retreading to be performed and the design of non-skid projections it is desired to impress in the rubber. The novel illustrated shape is adapted to perform the type of retreading or capping disclosed in my aforesaid applications Serial Nos. 163,509 and 200,380, wherein the molding face includes inwardly-projecting ribs 38, 39, 40 and connecting surfaces for molding longitudinal grooves and adjacent ribs in the new tread rubber, and eaves-like marginal tread-sole molding and sealing portions 41 adapted to accommodate the widest tread for which the mold is intended, and to overhang the shoulder edges of any narrower tread as shown in Fig. 1, and thus to fit the worn tread shoulders of the tire over an indeterminate tread width. The worn sole surface of the shoulder of the old tread acts as a dam against the molding and sealing surface 41, to limit the outward flow and prevent substantial overflow of the new tread rubber, and the preparation of the old tread, if any, may include a sufficient removal of rubber therefrom, as by a marginal shallow grooving or channeling thereof when the marginal molding rib 40 is of sufficient depth to require it, in order to permit a flow of the new rubber under said marginal rib during vulcanization. The result is a new tread requiring the minimum amount of rubber in proportion to the depth and width thereof, forming a flush, tapered or slightly lapped edge joint with the old rubber, so that the sole or wearing surface of the shoulder in the retreaded tire is partly of new and partly of old rubber and the composite tread has the full width of that on the worn tire.

Each half of the vulcanizer is provided with a tangent pressure ring 42, for engaging and more or less compressing the side of the tire when the platens are brought together, said ring having a screw-threaded joint 43 with the platen 10 or 12, enabling the pressure ring to be set or adjusted to conform to the size of the tire under treatment, before inserting the latter. When these pressure rings have been properly adjusted and a deflated, rim-mounted tire fitted to the lower half of the vulcanizer, with or without a spacer ring 29 according to the width of the particular tread, the upper platen is closed and the two clamped upon the tire, and the latter is then inflated to the desired internal pressure for vulcanization, the inflation forcing its tread radially outward and perfecting the seal between the tread shoulder and the molding surface 41.

The above-described tread-molding matrices having substantially the form and relation to side pressure rings illustrated in Figs. 1, 2, 3, 5 and 6, as well as the described and illustrated mode of detachably retaining the matrices on their platens are claimed in my copending application Ser. No. 258,216, filed February 24, 1939.

In the modification represented in Fig. 4, insert matrix rings 25, which may be of segmental construction and detachably mounted and retained in heater platens 10, 12 of a hinged vulcanizer substantially in the manner previously described, and used either with or without a spacer ring 29 which is retained by an arcuate key 34, are formed with cylindrical seating surfaces 45 to coact with complemental cylindrical surfaces 46 on the inner walls of the steam-jacket chambers 19, and also with male conical heat-transmitting surfaces 47 which coact with female conical seating surfaces 48 on the platens. The seating surfaces 48 are continued radially inward as tire-confining surfaces, and adjacent confining or pressure rings 49, which act as tangent cooling rings to prevent overheating of the tire sides, are provided, as is customary. This type of vulcanizer may be used to perform either full retreading, where the tire is prepared by removal of all of the old tread rubber and some of the adjacent side-wall rubber, or conventional capping, where old rubber is removed for a portion only of the tread depth and new rubber is laid over the crown and partly down the sides of the old tread, or top capping, where the preparation includes removal of a portion of the old tread rubber over the full tread width, without a new covering on the sides.

I claim:

1. A tire vulcanizer comprising a pair of separable heater press platens formed with female, substantially conical mold seats, for receiving molds of different cavity widths and diameters, a pair of mating mold members formed with narrower male, substantially conical seating surfaces interfitting with the female seats of the platens, means for detachably securing said mold members to the platens, and means adjustable for molds of different widths, for clamping said platens in closed position.

2. A tire vulcanizer according to claim 1 in which the angularity of the seating surfaces is of the order of 15 to 20 degrees to the central plane.

3. A tire vulcanizer according to claim 1 having additional coacting seating surfaces on each platen and its matrix, radially outward of the conical surfaces.

4. A tire vulcanizer according to claim 1 having a molding cavity formed by substantially conical tire-side contacting portions which are extended outwardly to form tread matrix seats, and by the pair of mold members which constitute tread molding matrices detachably held against said conical seats.

JAMES C. HEINTZ.